Nov. 19, 1963  E. MEYER  3,111,211
OVERLOAD RELEASE
Filed Aug. 9, 1960  5 Sheets-Sheet 1

INVENTOR
Edward Meyer

BY *Strauch, Nolan & Neale*
ATTORNEYS

Nov. 19, 1963     E. MEYER     3,111,211
OVERLOAD RELEASE

Filed Aug. 9, 1960     5 Sheets-Sheet 5

INVENTOR
Edward Meyer

BY *Strauch, Nolan & Neale*

ATTORNEYS

United States Patent Office 3,111,211
Patented Nov. 19, 1963

1

3,111,211
OVERLOAD RELEASE
Edward Meyer, Sioux Falls, S. Dak., assignor to Overload Control, Inc., a corporation of South Dakota
Filed Aug. 9, 1960, Ser. No. 48,417
10 Claims. (Cl. 192—150)

The present invention relates to an overload release mechanism and more particularly to an overload release mechanism for relieving drive cable and like load moving members of breaking forces when the resistance to movement of the load exceeds the load capabilities of the cable or like load moving member.

While the present overload release mechanism may be used in connection with cable or chain drive elements of elevator mechanisms, winch driven mechanisms of various types where the live run of the cable or chain may be overstressed, it is particularly adapted to usage in connection with earth moving equipment such as road building scrapers of the type disclosed in United States Letters Patent 2,288,629 and 2,288,630 issued July 7, 1942, to R. G. LeTourneau, and 2,418,041 issued March 25, 1947 to applicant and Ted J. Poppe and similar scrapers marketed by Caterpillar Equipment Co. under the designation DW-20 and DW-21.

The primary object of the present invention resides in the provision of an overload release mechanism which functions to introduce a momentary slack in the live run of the load moving cable or member while the power source is being cut off to maintain the tension in the live run of the load moving member below the breaking point.

A further important object of the present invention is to provide an overload release member which introduces a loop in the live run of the load moving cable or member and maintains the loop only so long as the longitudinal tension in the loop remains below the breaking point of the load moving member.

More particularly the present invention provides an overload release mechanism comprising a support frame adapted to be mounted on the stationary frame of a movable load member between the movable load member and a powered take up reel and supporting, a pair of pulley sheaves for rotation around spaced fixed axes of rotation, a relatively movable support structure carrying a third pulley sheave for rotation around an axis toward and away from the pair of pulley sheaves, biasing means of predetermined strength for yieldingly retaining the third pulley sheave a maximum distance from the pair of pulley sheaves and actuator means responsive to relative movement of the movable support structure and the support frame for cutting off the powered take up reel upon a predetermined movement of the third pulley sheave toward the pair of pulley sheaves.

Another object of the present invention resides in providing an overload release mechanism for a powered cable reel comprising a series of three pulleys normally supported in triangular relation to one another to introduce a loop in a run of a load moving cable or like member, one of the pulleys being mounted on a movable support for movement toward and away from the other two pulleys, an actuating cam track on the movable support, cam follower means carrying a spring biased crank arm and adapted to engage the cam track, means to bias the movable support to maintain the normal triangular pulley relationship and means connecting said crank arm to an actuator for disrupting the drive to the powered cable reel upon movement of the movable support member away from its biased position.

Still further objects of the present invention will appear from the following description and appended claims when read in conjunction with the accompanying drawings wherein:

2

Figure 1:
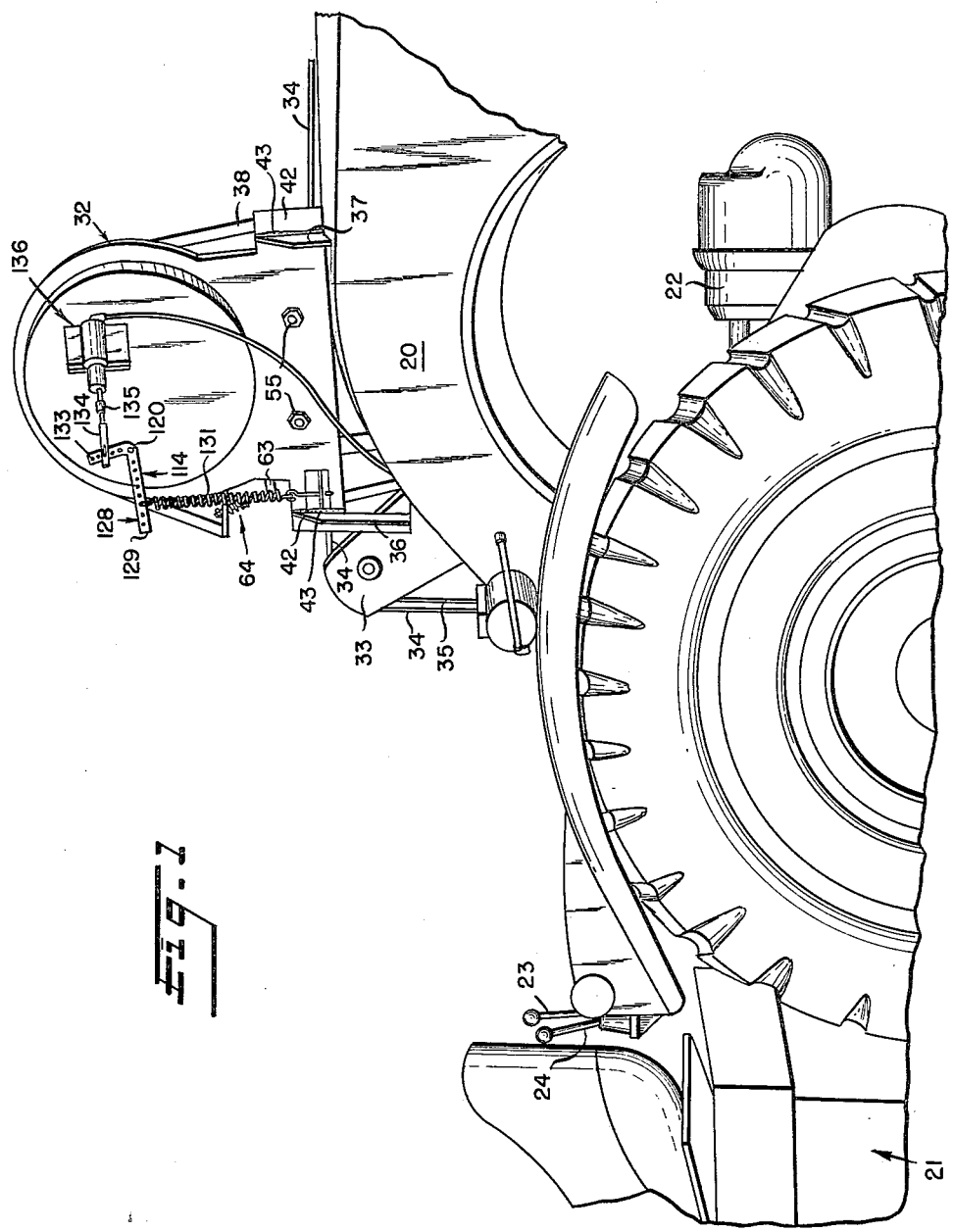
FIGURE 1 is a fragmental pictorial side view of a tractor and road scraper showing the overload release mechanism of this invention mounted on the forwardly projecting gooseneck unit or hitch portion of the frame of a conventional Caterpillar Tractor Company road scraper.

Modern road building and similar earth moving excavation operations are normally performed with extremely large earth moving equipment including bull dozers and tractor drawn scrapers having load carrying bowls for receiving several tons of earth scraped up and stored therein automatically as the scraper is drawn forwardly over an area to be levelled to a predetermined lower grade. It is usual practice to ram the earth forming high spots or elevations into the load carrying bowl through forwardly facing loading and unloading openings in the front bowl wall located above a laterally coextensive scraper blade fixed to the front drop portion of the bowl bottom wall which is lowered to dig into the mounded earth as the scraper is drawn forwardly to remove a strata of earth up to as much as a foot or more deep, the forwardly facing opening in the front wall being of a sufficient height to freely admit the full height of the removed earth strata. When filled, the bowl loading and unloading opening is closed by a vertically swinging apron or closure gate to retain the earth load, usually weighing several tons, in the load carrying bowl for transportation to low areas where the earth load is to be unloaded and distributed over the low areas to bring such low areas up to the predetermined grade. Unloading of the earth load is effected by raising of the closure gate as the scraper is drawn across the low areas and forward movement of a tailgate or load pusher plate mounted on a carriage or similar structure supported by the bowl side walls for relative fore and aft movement with respect to the bowl side walls and the front wall and closure gate.

Actuation of the closure gate and pusher plate is customarily effected by cables the free ends of which are connected respectively to the closure gate and pusher plate and the opposite ends of which are secured to and reeled upon respective powered winch drums mounted on the tractor and driven by the tractor power take-off mechanism in conventional manner. The intervening runs of the cables are respectively trained over suitably located idler pulleys on the scraper frame to guide the cables on and off the tractor winches.

The structure so far described is conventional structure, does not form a part of the present invention and, therefore, is not illustrated in the drawings. While many variations of the preceding generally described structure may be found in the commercial art, a sufficient disclosure for the present invention may be had upon reference to United States Letters Patent 2,418,041, issued March 25, 1947, to applicant and one Ted J. Poppe and United States Letters Patent 2,288,629 and 2,288,630, issued July 7, 1942, to R. G. LeTourneau.

In the accompanying drawings where the same reference numerals are employed throughout to indicate the same parts, FIGURE 1 shows the gooseneck unit or hitch portion 20 of a conventional earth moving scraper in connected relation to a tractor unit 21 having a power take-off unit 22 and winch control levers 23 and 24 respectively adapted to control the cable winch of the tailgate or pusher plate and the apron or closure gate of the earth moving scraper. Lever 23 is generally referred to as the "crowd" lever since it controls the pusher unloading plate which "crowds" the earth forwardly toward the front loading and unloading opening and the swingable apron during unloading operation of the scraper. The lower end 25 of "crowd" lever 23 (FIGURE 2) carries an abutment screw 26 which is disposed in forward spaced alignment to a trip screw 27 adjustably threaded into the free end of the piston 28 of a hydraulic cylinder assembly 29 normally provided by the Caterpillar Tractor Company on the tractor of its tractor drawn earth moving scraper assemblies. Cylinder assembly 29, when actuated by introduction of pressure fluid into the right end of the cylinder, drives piston 28 and trip screw 27 to the left as viewed in FIGURE 2 to engage abutment screw 26 and rotate lever 23 and its mounting shaft clockwise to "off" control position thereby shutting off the power drive from power take-off 22 suitably controlled in conventional manner by rotation of shaft 31. While this control assembly is conventional, actuation of cylinder assembly 29 has in the past been effected solely by engagement of the tailgate or its supporting carriage with limit switches located at the extreme end of its unloading movement.

The novel overload release mechanism 32 of this invention is mounted on the gooseneck unit 20 of the scraper frame structure ahead of the feed off guide pulley assembly 33 carried by gooseneck unit 20 to feed the operating cables 34 and 35 for the tailgate or load pusher plate and the movable apron or closure gate downwardly onto their respective power driven winches (not shown) carried by the tractor 21. Suitable support brackets 36 and 37 fixed to the guide pulley assembly 33 at the lower corners of its opposite side faces and gooseneck unit 20 and brace bars 38 in the form of angle irons rigidly mount the overload release mechanism 32 on the scraper frame gooseneck unit 20.

Figure 2:
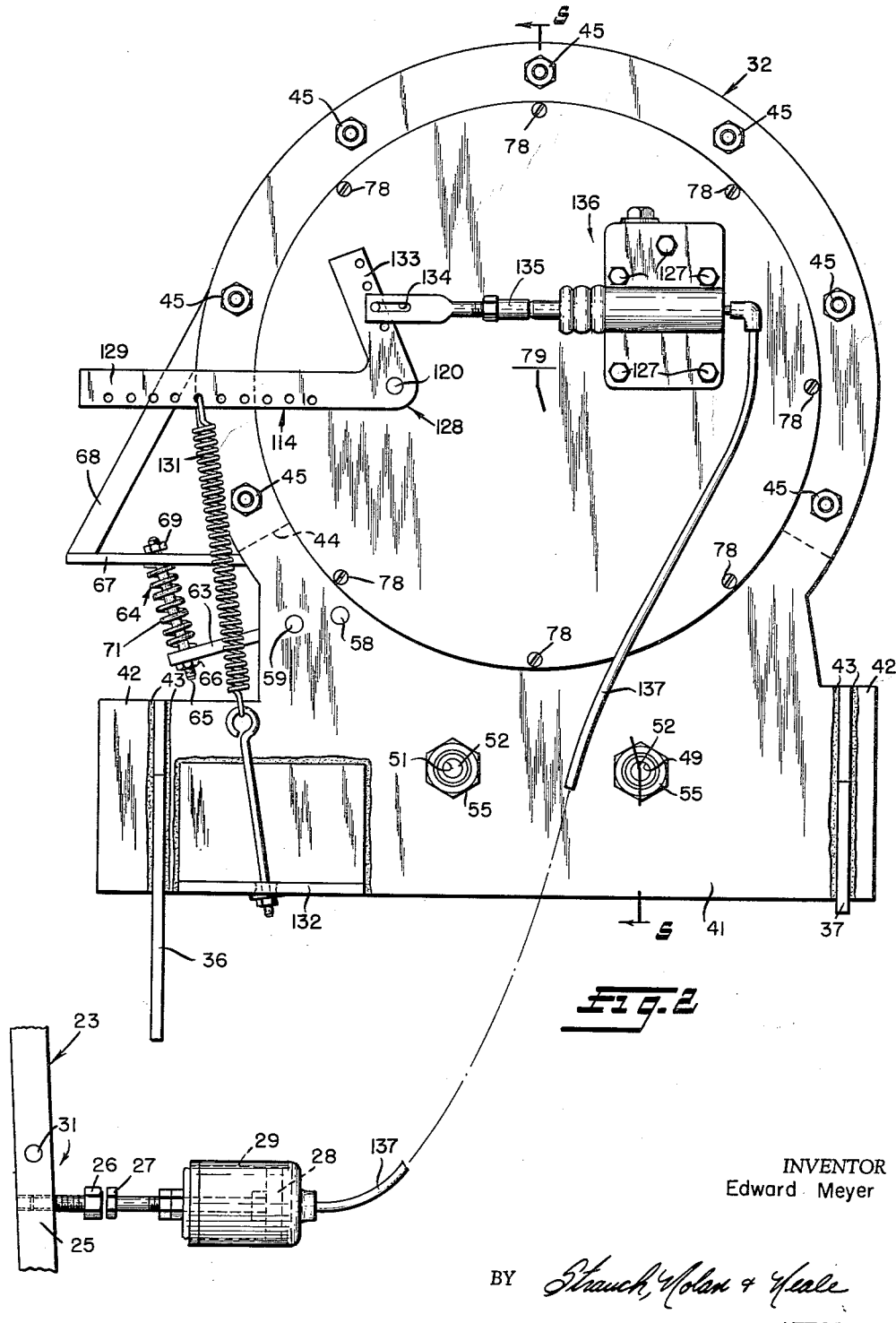
FIGURE 2 is an enlarged side elevational view of the overload release mechanism of FIGURE 1 viewed as in FIGURE 1.
Figure 3:
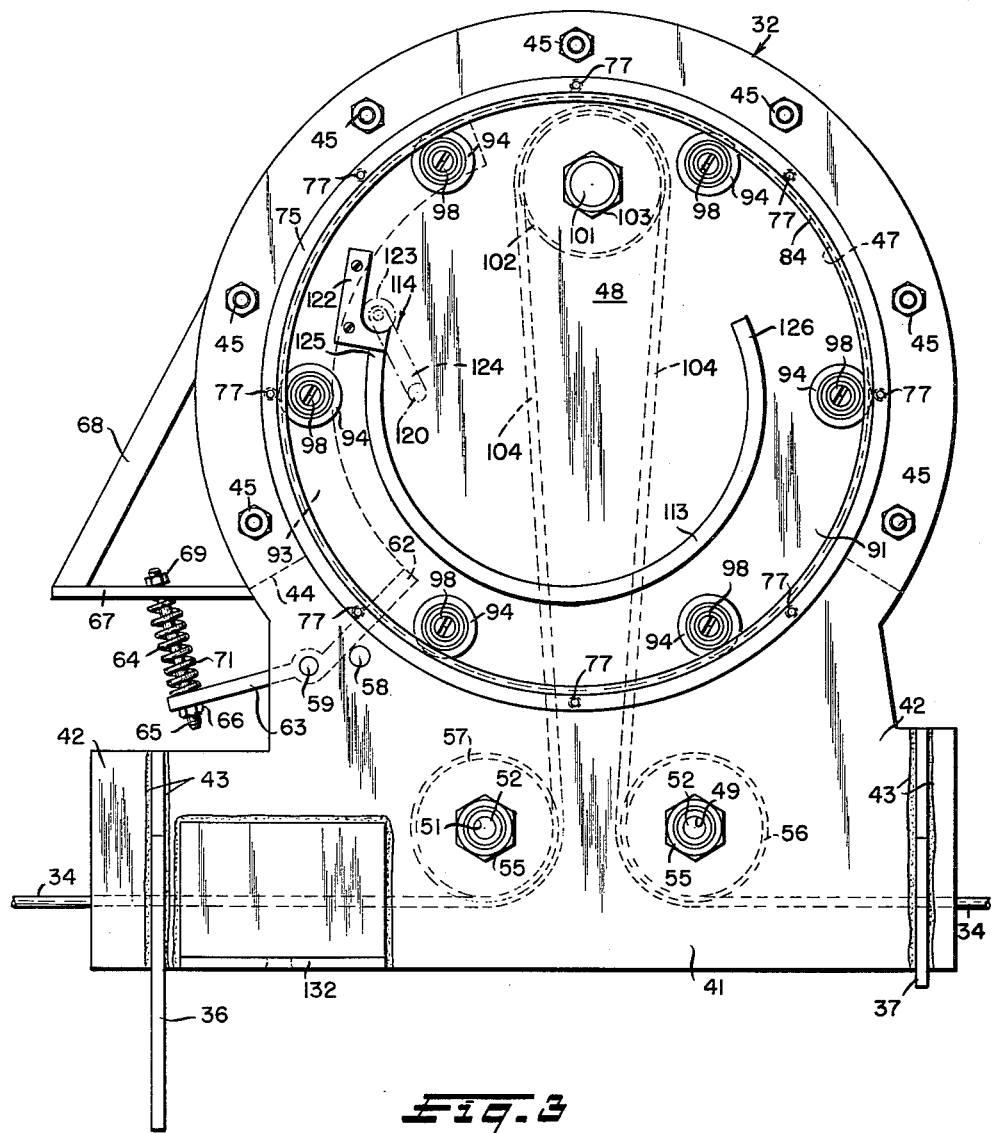
FIGURE 3 is a side view of the overload release mechanism as seen in FIGURE 2 with the side cover plate removed and the cam follower carried by the cover plate shown in dot-dash lines in the position assumed when the overload release mechanism is in its normal home or "cocked" operating position.
Figure 4:
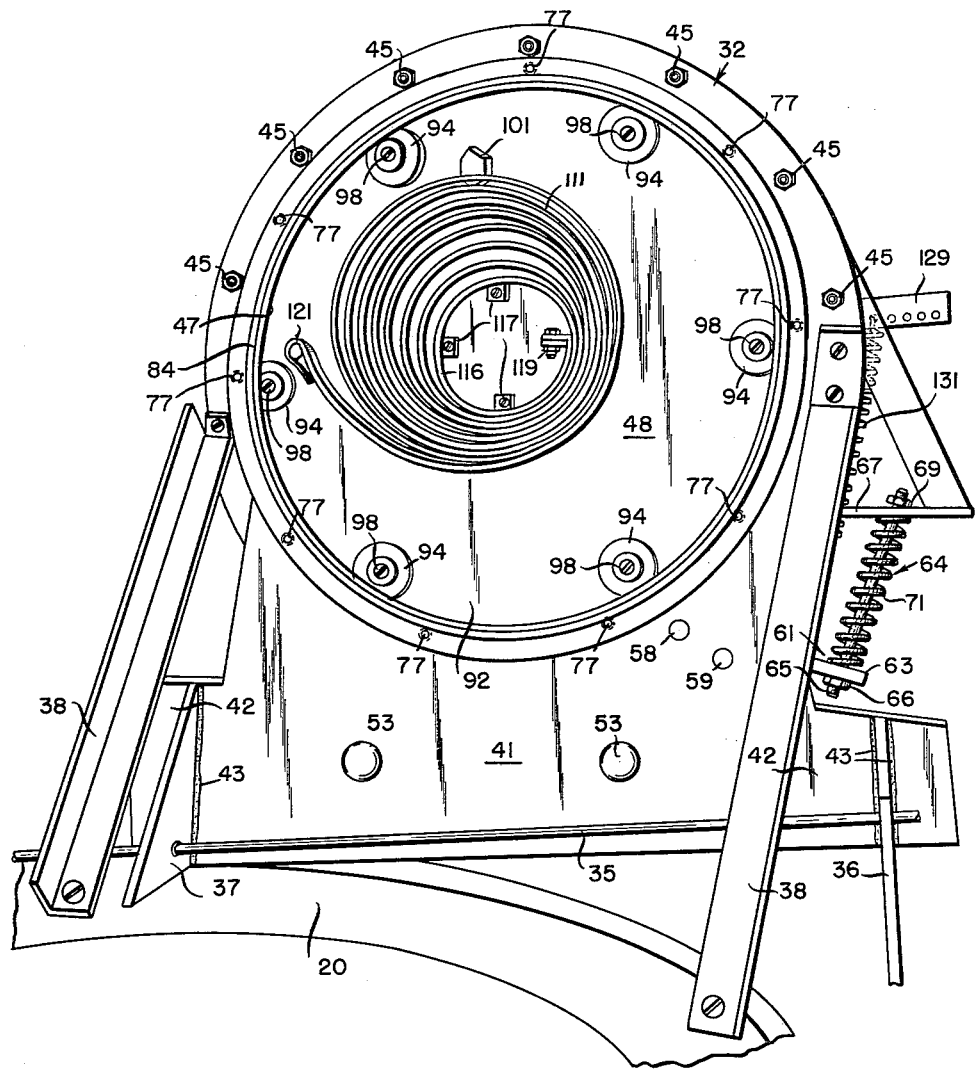
FIGURE 4 is a side view of the overload release mechanism as seen from the side opposite that of FIGURE 2.
Figure 5:
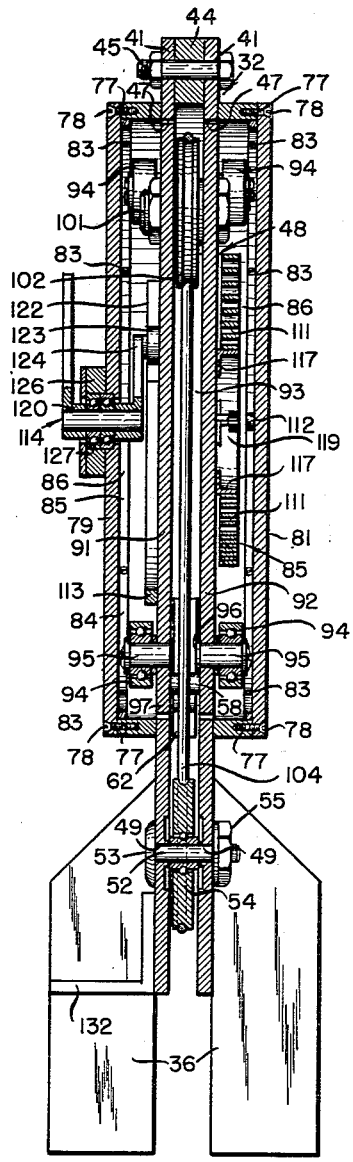
FIGURE 5 is a vertical sectional view through the overload release mechanism of this invention taken substantially on line 5—5 of FIGURE 2 looking in the direction of the arrows.

As best seen in FIGURE 1, cable 34 extends forwardly in spaced relation above the plane of the upper surface of gooseneck unit 20 in generally tangential relation to the upper portion of the pulley of guide pulley assembly 33 and the overload release mechanism straddles cable 34. This straddling relationship may be established in any of many more or less obvious ways. However, the presently preferred unit disclosed in this application contemplates a pair of identical side plates 41 having respective forwardly and rearwardly directed mounting ears 42 to which brackets 36 and 37 are preferably welded as indicated by numeral 43 in FIGURE 2 and a spacer connector member 44 of arcuate shape extending throughout the peripherally opposing marginal faces of the upper 300° angular area of plates 41 and bolted thereto by securing bolts 45 to effect a rigid support frame assembly 46. As best seen in FIGURES 3, 4 and 5, each side plate 41 in concentric relation to its upper generally circular body portion is centrally apertured to provide a circular body opening 47 adapted to freely receive a relatively rotatable actuating means 48 to be presently described in detail.

Support frame assembly 46, as clearly seen in FIGURE 5, provides a pair of dependent spaced side walls apertured in alignment at 49 and 51 to receive the shank 52 of a headed journal pin the head 53 of which engages the outer face of one of the side plates as illustrated in FIGURE 5. Each of the journal pins is adapted to mount a journal bearing 54 the inner race of which is slightly longer than the outer race so as to be fixedly gripped between the opposing faces of side walls 41 when clamp nuts 55 are threaded on the threaded ends of shank 52. The relatively rotatable outer bearing race is preferably made in the form of a pulley sheave as indicated by numerals 56 and 57 of FIGURE 3 to provide a respective lead pulley and take-off pulley in relative fixed spaced relation between the depending side walls.

Referring for the moment to FIGURE 3, it is to be noted that pulleys 56 and 57 have their respective axes in the same horizontal plane and that the cable grooves are disposed tangent to the plane of the cable run extending forwardly to the conventionally existing guide pulley assembly 33. While a pulley sheave of any suitable size may be employed, it has been found preferable in a particularly efficient assembly now in use that each of the pulleys 36 and 37 be of nine (9") inch diameter, that the axis of pulley 56 be disposed a distance of seven and one half (7½") inches rearwardly of the axis of rotation of actuating means 48 and that the axis of pulley 57 be disposed five and one half (5½") inches forwardly of the axis of rotation of actuating means 48. The reason for the pulley dimensions and axes locations will be more fully explained presently.

Referring again to FIGURE 3 and also to FIGURE 4, side plates 41 are drilled in aligned opposition to receive a stop pin 58 which spans the space between the dependent side walls adjacent the opening 47 at the upper forward ends of the spaced side walls and is rigidly fixed thereto by welding or a forced fit connection as may be desired. Forwardly and slightly below stop pin 58 the dependent side walls are drilled in aligned opposition to fixedly receive a pivot pin 59. Pin 59 journals a cushioning stop lever 61 (FIGURES 3 and 4) one arm 62 of which extends upwardly and rearwardly into the space between the openings 47 of the support frame side wall plates and the other arm 63 of which extends generally forwardly to receive a biasing spring assembly 64 arranged to normally bias lever 61 in a counterclockwise direction around pin 59 and arm 62 away from stop pin 58 for a purpose to be hereinafter pointed out. To this end biasing spring assembly 64 comprises a threaded shaft 65 the lower end of which passes through a suitable aperture in arm 63 and threadedly receives an adjustment nut 66 and the other end of which extends through an anchor plate 67 fixed at one end as by welding or the like to the peripheral outer edges of side plates 41 and the spaces element 44. A suitable bracing strut 68 extending between the other end of anchor plate 67 and the peripheral outer edge of spacer element 44 and welded thereto at its opposite ends is provided to rigidify anchor plate 67. The upper threaded end of shaft 65 is provided with an abutment nut 69 adapted to engage the upper surface of anchor plate 67 and a coil compression spring 71 is disposed in encircling relation to the intermediate portion of shaft 65 with its opposite ends abuttingly engaging the opposing faces of lever arm 63 and anchor plate 67. By suitable adjustment of nut 66 alone or nuts 66 and 69 the desired resistance of spring 71 may be suitably varied to effectively establish a desired cushioning effect for actuating means 48 as will presently appear.

While actuating means 48 may be rotatably supported in side wall openings 47 in any suitable manner, the presently preferred embodiment contemplates roller support rings 75 and 76 bolted to the respective side walls by headed bolts (not shown) the heads of which are countersunk in the inner opposed faces of side walls 41 and the shanks of which thread into suitable tapped openings annularly spaced along the side wall abutment edges of the respective rings. The outer free edges of the respective rings are suitable tapped at 77 (FIGURES 3, 4 and 5) to receive securing screws 78 provided to secure end cover plates 79 and 81 to the respective roller support rings 75 and 76. Each roller support ring 75 and 76 throughout the outer marginal edge of its inner annular wall face is suitably tapped in spaced angular relation to screws 78 to receive securing screws 83 provided to secure roller retainer rings 84 thereto. If desired, rings 84 may be split as indicated at 85 (FIGURE 5) to avoid the need of careful machining operations to assure a full abutment engagement between rings 84 and their respective support ring roller engaging faces 86.

Preferably the inner roller engaging faces 86 are accurately machined and polished to assure an effective roller track surface that is exactly concentrically related to the axis of sidewall openings 47. In this way, concentric rotation of actuating means 48 is assured.

It is to be understood, however, that support frame assembly 46 could be formed to provide oppositely directed centerpost journals for actuating means 48 without departing from the spirit of the present invention and such a modification is intended to be included in the scope of the broader claims appended hereto.

In the presently preferred embodiment of the invention, actuating means 48 comprises disk means in the form of a pair of circular disks 91 and 92 rigidly interconnected throughout a substantial arcuate area by a spacer member 93 at one side of the center axis. If further rigidity should be desired the area of the spacer member could be increased in a direction toward the center or the gauge of metal employed in disks 91 and 92 could be increased. The diameter of disks 91 and 92 is somewhat less than the diameter of openings 47 in side walls 41, about one quarter of an inch, and in the existing commercial structure is twenty four (24″) inches. With such a diameter, it has been found desirable to employ six equal angularly spaced support rollers 94 on each face of actuating means 48. To this end, disks 91 and 92 are drilled at 60° intervals to receive stub journal shafts 95 (FIGURE 5) one of the ends of which are preferably pressed fitted into the plate apertures and welded to the inner disk faces as indicated at 96 to permanently fixedly secure shafts 95 to the respective disks. A suitable spacer washer 97 is disposed on each shaft 95 in position to lie between the face of the respective disk and the inner race of the combined journal bearing and roller 94 the outer race of which rides on the roller engaging faces 86 of its respective roller support ring 75 or 76 in end opposed relation to roller retainer rings 84. Each combined journal bearing and roller 94 is retained against axial movement on its shaft 95 by a clamp screw and washer assembly 98 (FIGURES 3 and 4) the washer of which overlaps the outer end of the inner bearing race and the screw of which threads into a suitable centered and tapped screw opening formed in the outer end of each stub shaft 95. It will be appreciated that when the screw of the clamp screw and washer assembly 98 is threaded home the inner bearing races will be fixedly clamped to the shaft 95 by the clamping engagement between spacer washer 97 and the washer of assembly 98 so that no frictional wear occurs between the disk and its several rollers and that this clamped relation establishes a running clearance between the retainer rings 84 and the respective outer ends of the combined journal bearing and roller 94. As a consequence, actuating means 48 is supported for rolling engagement on faces 86 with axial movement limited by engagement of the roller outer races with the retainer rings 84 thus minimizing frictional resistance to free relative rolling movement between actuating means 48 and support frame assembly 46.

The disks 91 and 92 support between them a headed journal pin 101 the axis of which is carefully located so that when actuating means 48 is disposed in its normal position illustrated in FIGURE 4 the axis of the journal pin will lie along the intersection of a vertical plane bisecting the spacing of pulleys 56 and 57 and a horizontal plane disposed normal to the vertical diameter of the disks 91 and 92 at a point four and one half (4½″) inches downwardly along the vertical diameter measured from the periphery of the disks. The reason for this method of location of the axis of pin 101 will presently appear.

Pin 101 mounts a third pulley sheave 102 (FIGURES 3 and 5) similar in all respects to pulley sheaves 56 and 57, the inner race of sheave 102 being clamped between disks 91 and 92 upon threading clamp nut 103 home on the shank of pin 101. The aforementioned location of the axis of pin 101, as will be apparent from FIGURE 3, assures a cable loop having equal length runs 104 between the pair of pulleys 56—57 and pulley 102 when actuating means 48 is in its normal position. As a consequence, the rotational force moment tending to rotate actuating means 48 is equally distributed between cable runs 104 so long as actuating means 48 is in its normal home position in spite of the fact that the offset relation of sheave 102 to the rotational center of actuating means 48 tends to impart a clockwise rotational force to the actuating means. This rotational tendency is counteracted in the present invention by a counterclockwise biasing force sufficient to overcome an axial pull along cable runs 104 just short of the cable breaking force. Since this force in actual usage in the environment disclosed where cable speeds of six hundred fifty (650′) feet per mniute are not out of the ordinary may momentarily reach a value of forty thousand (40,000) pounds, it will be appreciated that the double ended support of the cable pulley journal pins and the double roller and track arrangement for supporting the actuating means.

To properly counteract this rotational tendency and at the same time provide a prompt cut off of the power source, the present invention provides a clock type return or biasing spring 111 connected at one end to disk 92 and at its other end to a spring connector post 112 protruding inwardly from cover plate 81 (FIGURE 5) and an actuating cam 113 mounted on disk 91 (FIGURES 3 and 5) and cam follower assembly 114 (FIGURES 1, 3 and 5) mounted on cover 89.

Figure 6:
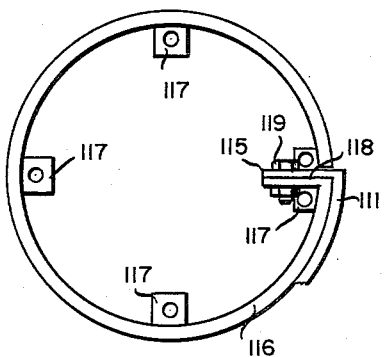
FIGURE 6 is a detailed elevational view of the return spring connector employed to connect the inner end of the return spring to the rotatable disk assembly.

Referring first to return springs 111, its inner end is bent as shown at 115 (FIGURE 6) and suitably apertured for bolted attachment to an annulus 116 comprising a stiff metal ring having integrally formed mounting lugs 117 and an integral terminal spring end connector arm 118. A bolt and nut assembly 119 is preferably employed to secure spring end 115 to connector arm 118 and lugs 117 are preferably apertured adapting them for bolted attachment to disk 92 in coaxial relation thereto. As best seen in FIGURE 5, the height of annulus 116 preferably exceeds the width of spring 111 so the spring will be located outwardly from the face of disk 92 to clear the head of journal pin 101 and to dispose its opposite looped end 121 (FIGURE 4) in position to encompass connector post 112 well down from its free end. Spring 111 is of special construction since it is intended in use to apply an eight hundred (800) pound biasing force to actuating means 48. In order to set the spring to provide the desired biasing force, cover 92 is brought opposite ring 76 and moved axially into place against the ring edge care being taken to thread post 112 into spring end loop 121. The cover is then rotated in a clockwise direction as viewed in FIGURE 4 to wind spring 111 to the desired tension. When suitably wound, the cover securing screws 78 are inserted and screwed home to secure the cover and retain spring 111 in its wound condition. This biasing spring normally disposes actuating means in the position shown in FIGURE 3 where in the spacer element 93 engaging arm 62 of lever 61 with stop pin 58 provides a positive stop which is reached only after the spring biased lever has first cushioned the biasing movement of actuating means 48 as it approaches its home or normal position.

Turning next to the actuating cam 113 and cam follower assembly 114, cam 113 in the form of a helical cam track is secured to disk 91 in end abutting relation to a cam dwell plate 122 bolted to disk 91 in position to receive the cam follower roller 123 journalled on arm 124 of the cam follower assembly 114 (FIGURES 3 and 5) carried by shaft 120 journalled in cover 79 as will presently appear. As best seen in FIGURE 3, the end 125 of cam 113 adjacent dwell plate 122 is disposed radially outwardly the greatest distance from the rotational axis of actuating means 48 and the cam track formed by cam 113 moves progressively radially inward in a counterclockwise direction to its innermost end 126 as viewed in FIGURE 3. As a consequence, it will be appreciated that when the pull on pulley 102 exerted by cable runs 104 exceeds the biasing force of spring 111 actuating means 48 will undergo clockwise movement as seen in FIGURE 3. Such clockwise movement of actuating means 48 will force cam follower roller 123 out of its home position in dwell plate 122 onto the cam track provided by cam 113 and introduce some degree of slack momentarily into the cable loop around pulleys 56, 102 and 57 to relieve the tension of the cable approaching the breaking point. To assure free movement of shaft 120, homing of the roller 123 in dwell plate 122 and driving engagement of roller 123 against cam 113, a journal boss 126 is formed on cover 79 in any suitable manner, for example by welding a metal block thereto and drilling a stepped bore journal opening therethrough to receive a double row ball bearing 127 for journalling shaft 120, and the outer end of shaft 120 is non-rotatably fitted with a bell crank 128 one arm 129 of which is connected to a tension biasing spring 131 (FIGURE 1) the opposite end of which is connected to a spring anchoring angle iron 32 (FIGURES 1, 2 and 5) welded to the face of the support frame assembly 46. Since biasing spring 131 acts to bias cam follower assembly 114 in a counterclockwise direction around the axis of shaft 120, it will be appreciated that cam follower roller 123 and arm 124 are yieldingly maintained in cooperating engagement with cam 113 at all times.

The other arm 133 of bell crank 128 is connected through a lost motion connection 134 and linkage 135 to the piston of a hydraulic cylinder assembly 136 bolted to cover 79 by cap screws 127 so that the initial movement of cam follower assembly 114 to shift roller 123 from dwell plate 122 to cam 113 will be ineffective to operate the piston of cylinder assembly 126. However, camming movement of follower arm 124 upon continued rotation of actuating mechanism will move the piston of hydraulic cylinder assembly 124 to the right as seen in FIGURES 1 and 2 forcing hydraulic liquid through tube 137 into cylinder 29 causing piston 128 and its trip screw 27 to move to the left as seen in FIGURE 2 engaging trip screw 27 with abutment screw 26 of "crowd" lever 23 and forcing lever 23 toward its "off" or drive disconnect position. At the same time pulley 102 will continue its clockwise movement toward pulleys 56 and 57 progressively introducing more of the loop runs 104 into the cable run as slack to prevent the cable tension reaching the breaking force. In the embodiment dimensioned as described, some eighteen (18) to twenty (20) inches of cable slack can be introduced into the run off portion of cable 34 during the time that it takes to shut off the power to the cable driving winch. It has been found in practice that this slack introduction is wholly sufficient to assure that the cable tension will be maintained below the cable breaking point during the interval of time necessary to bring the cable winch to a full stop from its maximum speed of operation.

It will be appreciated from the preceding description that the customary existing limit switch controlled hydraulic shut off cylinder assembly is well adapted to applicant's automatic overload release attachment and that the present invention is ideally suited for use as an attachment item for existing road scraper equipment. It will also be appreciated that the present invention will be of extreme value in this field wherein equipment rental charges of $20.00 or more an hour are lost because of enforced shut down of as much as three hours at a time is required where cable breakage occurs, sometimes as often as two or three times a day where excavating operations are carried on in heavy clay or wet dirt.

To better understand the operation of this invention, it will be assumed that a road scraper of the character heretofore mentioned has been fully loaded and is moving across a low fill area for unloading. "Crowd" lever 23 is moved by the tractor operator to its on position and the cable winch is operating at full speed to drive the scraper tailgate or pusher plate forward to force the earth out through the loading and unloading opening provided between the closure gate or apron and the bowl bottom wall. The load of earth, as a result of forward movement of the tailgate, becomes compacted between the tailgate and the apron or contains a log, stump or some other obstruction unknown to the operator who is busy driving the rig over the fill area. The compaction or obstruction arrests the forward movement of the tailgate and tension in the cable run to the winch builds up rapidly to the danger point overcoming the biasing force established by spring 111. Actuating means 48 begins to move in a clockwise direction introducing an increment of slack into the cable run from shortening of the loop runs 104 momentarily reducing the cable tension to a safe value and momentarily reduces the compaction force on the unloading earth or obstruction with the result that the compacted arch is relieved of compaction forces momentarily. Occasionally where earth alone is involved this momentary release of compaction forces permits the arch to break down restoring normal unloading conditions. If this should happen, spring 111 will return the actuating means 48 to its home or cocked position and the operator with his hand on the "crowd" lever will sense that no force is being applied to move the "crowd" lever to off position and unloading will proceed as if nothing had happened. In event the arch does not break so that normal unloading may resume, the continued clockwise movement of actuating means 48 will cause cam 113 to move follower assembly 114 in a direction to compress the hydraulic fluid in assembly 136 and force it through tube 137 to cylinder 29 with the result that piston 28 will be forced to the left moving "crowd" lever 23 in opposition to the operator's manual engaging effort with the result that continued shutting off movement of "crowd" lever 23 will result until the arch gives away or the winch is completely shut off. When a complete shut down occurs, the operator will be free to stop all operations and see to removing the obstruction. Similarly if unloading continues normally until the tailgate reaches its fully unloaded position adjacent the bowl front wall, the tension will build up in the same manner as if an obstruction is encountered and the winch will be shut off without cable breakage. Applicant's overload release, therefore, takes the place of the present limit switch arrangement and at the same time performs the further and novel function of a cable breakage preventer.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a power driven cable an overload release interposed in the cable run between the load and the controlled source of driving power and comprising a support frame; a pair of cable guide pulleys supported by said frame in spaced tangent relation to said cable run to provide a lead pulley and a take-off pulley; actuating means mounted on said support frame for rotation with respect to said support frame and to one side of said pair of guide pulleys; a third cable guide pulley mounted on said actuating means for bodily movement between a normal position wherein said pair of pulleys and said third pulley introduce a cable loop in said cable run and a release position adjacent said pair of pulleys to effectively introduce said cable loop into said cable run as slack; resilient means of predetermined force less than the cable breaking force biasing said actuating means in a direction to dispose said third pulley in its normal position in which its axis lies on a line of force exerted by said cable loop at the side of the axis of rotation of said actuating means nearest the lead pulley against the pull of the cable loop around said three guide pulleys to establish a release force; cam means mounted on said actuating means in eccentric relation to the axis of rotation of said actuating means, cam follower means including a journal shaft journalled on said support frame for movement by said cam means upon rotation of said actuating means by the excess pull of the cable loop over the predetermined release force; and means interconnecting said cam follower means and the controlled power source for deenergizing the power source upon arcuate movement of said third pulley to its release position whereby the driving force on said cable will be relieved and loop slack effective to maintain the cable pull force below the cable-breaking point will be introduced into said cable run during the time interval required for deenergization of the power source.

2. The combination of claim 1 wherein the normal position of the actuating means is determined by a support frame pivoted lever one arm of which is abuttingly engaged by a cushioning spring biasing the other arm away from a positive stop and the other arm of which lies in the path of movement of a portion of said actuating means and is biased away from said positive stop sufficiently to yieldingly intercept said actuating means when it is returned to its normal position by said resilient means.

3. The combination of claim 1 wherein the support frame comprises plate means providing axially spaced shaft end bearing supports for the opposite shaft ends of said pair of cable guide pulleys and passage means for the cable loop around said pair of guide pulleys and wherein said actuating means comprises disk means relatively rotatably supported by said plate means and providing cable passage means communicating with said support plate passage space, shaft end bearing supports for the opposite shaft ends of said third cable guide pulley, and helically arranged cam means engageable with the free end of said cam follower means.

4. The combination of claim 3 wherein said plate means has respective annular roller guide rings secured to its opposite faces and said disk means has oppositely outwardly extending roller stub journal shafts fixed thereto and respective rollers journalled thereon in position to engage the inner annular face of said roller guide rings and to support said disk means for rotation relative to said plate means.

5. The combination of claim 1 wherein said means interconnecting said cam follower means and the controlled power source comprises a part of said journal shaft of said cam follower means; a bell crank fixed to said part of said journal shaft and having one arm connected to a resilient biasing element connected to one arm of said bell crank and biasing said journal shaft and bell crank in a direction to yieldingly engage said cam follower means with said cam means and a second arm; a control for said power source having on and off positions actuator means connected to said second arm of said bell crank and said control adapted to move the control of said power source from its on position to its off position when said bell crank moves under influence of said cam means.

6. An overload release unit adapted for interposition in a cable run between the load and the controlled source of driving power comprising a support frame; a pair of cable guide pulleys supported by said frame in spaced relation to provide a lead pulley and a take-off pulley; plate means mounted on said support frame to one side of said pair of guide pulleys for rotation with respect to said support frame; a third cable guide pulley journalled on said plate means for movement between a normal position wherein said pair of pulleys and said third pulley form a cable loop path of maximum length and a release position wherein said pair of pulleys and said third pulley form a cable loop path of minimum length to effectively introduce slack into said cable run; resilient means of predetermined force less than the cable breaking force biasing said plate means to said normal position against the pull of the cable loop around said three guide pulleys to establish a predetermined release force; cam means mounted on said plate means in helical relation to the axis of rotation of said plate means; cam follower means, including a journal shaft, journalled on said support frame for movement by said cam means upon rotation of said plate means by the excess pull exerted by the cable loop on the third pulley over the predetermined release force; and means interconnecting said cam follower means and the controlled power source for deenergizing the power source upon movement of said plate means and said cam follower means whereby the driving force on said cable will be relieved by the cable slack provided by said loop being introduced into said cable run to maintain the cable pull force below the cable breaking point during the time interval required for deenergization of the power source.

7. The combination of claim 6 wherein the normal position of the plate means is determined by a support frame stop pin and a support frame pivoted lever one arm of which is abuttingly engaged by a cushioning spring biasing the other arm away from said pin, said other arm being disposed in the path of movement of a portion of said plate means and biased away from said stop pin sufficiently to yieldingly intercept said plate means when it is returned to its normal position by said resilient means.

8. The combination of claim 6 wherein the support frame comprises a pair of spaced interconnected plates providing respective spaced axially aligned shaft end bearing supports for said pair of cable guide pulleys and first passage means for the cable loop around said pair of guide pulleys and wherein said plate means comprises a pair of spaced interconnected disks relatively rotatably supported by said support frame and providing cable passage means communicating with said first passage means and shaft end bearing supports for said third cable guide pulley.

9. The combination of claim 8 wherein said pair of plates have respective annular roller guide rings secured to their exposed faces adjacent their peripheries and said disks have outwardly extending roller stub journal shafts fixed thereto and respective rollers journalled thereon in position to engage the inner annular faces of said respective roller guide rings to support said disks for rotation relative to said support frame.

10. The combination of claim 6 wherein said means interconnecting said cam follower means and the controlled power source comprises an end of said journal shaft of said cam follower means a bell crank fixed to said shaft end; resilient biasing means connected to one arm of said bell crank and biasing said cam follower means to engage said cam means; a control for said power source having on and off positions and actuator means connected to the other arm of said bell crank, said actuator means being adapted to move the controlled power source to its off position when said cam follower means and said bell crank move under influence of said cam means.

References Cited in the file of this patent
UNITED STATES PATENTS

| | | |
|---|---|---|
| 1,530,798 | Wildt | Mar. 24, 1925 |
| 1,949,119 | Gibbs | Feb. 27, 1934 |
| 2,624,032 | Hennessy | Dec. 30, 1952 |
| 2,685,417 | Bartelson | Aug. 3, 1954 |